though that material may be more resistant to washing out, since the gradual loss of mechanical properties which attends oxidative degradation is not arrested by the presence of such agents.

United States Patent Office 3,284,402
Patented Nov. 8, 1966

3,284,402
STABILIZED SULFUR CONTAINING ALIPHATIC POLYCARBONAMIDES
Robert W. Cottingham, Stoneham, Mass., assignor to E. I. du Pont de Nemours and Company, Wilmington, Del., a corporation of Delaware
No Drawing. Filed Feb. 27, 1964, Ser. No. 347,674
4 Claims. (Cl. 260—45.75)

This application is a continuation-in-part of application Serial No. 24,683, filed April 26, 1960, now abandoned.

This invention relates to synthetic linear polycarbonamides. More particularly, this invention relates to modified, synthetic, linear, fiber-forming polycarbonamides which exhibit substantially improved resistance to thermal and photolytic degradation.

Shaped articles composed of unmodified synthetic linear polycarbonamides, e.g., textile fibers of poly(hexamethylene adipamide), undergo a gradual discoloration and loss of mechanical properties upon prolonged exposure to heat and/or light. For most end uses, particularly in fabrics, this discoloration is very undesirable and additives, such as disclosed in U.S. Patents 2,510,777 and 2,705,227, are incorporated into such compositions to enhance the oxidative stability of the textile fibers. While the use of these additives provides better oxidative stability and improved processability and ultimate performance, the improvement in oxidative stability and mechanical properties is generally short-lived. The additives, being ionic materials, are gradually removed during subsequent washing, scouring, boil-off and other treatments, so that the protection afforded by such additives is eventually lost. Moreover, unless carefully practiced, the incorporation of the ionic additive may lead to difficulties if a delusterant is present, as the additive may cause the agglomeration of the delusterant particles. The use of optical whiteners does not overcome any of these disadvantages, even though that material may be more resistant to washing out, since the gradual loss of mechanical properties which attends oxidative degradation is not arrested by the presence of such agents.

It is therefore an object of this invention to provide a synthetic, linear, fiber-forming polycarbonamide having a long-lasting oxidative stability with retention of desirable mechanical properties. Another object is to provide a method for preparing such a linear, fiber-forming polycarbonamide which will not require substatnial deviation from conventional polycarbonamide preparation. Other objects will appear hereinafter.

The objects of this invention are accomplished by providing a synthetic, linear, fiber-forming polycarbonamide having recurring carbonamide groups as an integral part of the main polymer chain, said polycarbonamide having from about 0.2–1.5% weight divalent sulfur chemically bonded intralinearly along said main polymer chain.

The method by which the modified polycarbonamide of this invention is produced comprises the steps of: preparing an aqueous polycarbonamide-forming salt solution, adding to this salt solution an amide-forming sulfide, heating the resulting solution at a temperature between about 100° and about 275° C. and a pressure between about 15 and about 250 pounds per square inch for a period sufficient to provide a fiber-forming condensation polycarbonamide containing between about 0.2 and about 1.5% by weight of sulfur as an integral part of the main polycarbonamide chain.

The fiber-forming stage can be tested for by touching the molten polymer with a rod and drawing the rod away; if this stage has been reached a continuous filament of considerable strength and pliability is readily formed. This stage is generally reached when the polyamide has an intrinsic viscosity of about 0.4 where intrinsic viscosity is defined as $$log_e N_r / C$$

in which $N_r$ is the viscosity of a dilute solution of the polymer in metacresol divided by the viscosity of metacresol in the same unit and at the same temperature (e.g., 25° C.) and C is the concentration in grams of polymer per 100 cc. of solution.

In the following examples, which are intended to illustrate the invention, all parts and percentages are by weight unless otherwise specified. Throughout specification, the percentage by weight of sulfur is based on the weight of the sulfide containing polymer. Also in these examples, the extent of discoloration is measured colorimetrically using the differential colorimeter, as reported by Glasser and Troy in the Journal of the Optical Society, 42, page 652 (1952). By this procedure, numbers indicating the extent of yellowness ($\Delta b$) and the total discoloration ($\Delta E$) are measured in the test samples, and compared with similar numbers for a control sample. The lower these numbers, the less is the degree of discoloration produced by the indicated heat treatment.

The instrument (Weather-Ometer) employed here to determine durability of yarn upon exposure to light is a well-known device for measuring the effect of radiation upon a sample under conditions calculated to provide accelerated aging. In the procedure here employed a single layer of yarn was wound on a test panel with individual strands being separated from one another for uniformity of exposure and convenience in removal. Each sample was mounted upon a drum rotating once each minute at a distance of 15 inches from a carbon arc surrounded by a glass envelope.

Example I

To 5.13 kilograms of a 48.6% by weight solution of hexamethylene diammonium adipate is added 175 grams of the salt derived from equimolar amounts of hexamethylene diamine and 4,4'-bis-carboxyl-butyl sulfide and 8.0 grams of 25% by weight acetic acid. The resulting solution is charged to an evaporator and concentrated to a 60% by weight solution. The concentrated solution is then pumped into a stainless steel autoclave, and the autoclave is purged with oxygen-free nitrogen. The autoclave is heated to a pressure of 250 p.s.i.g. and a temperature of 210° C. at which point 34 grams of a 20% by weight titanium dioxide slurry is added. Heating is continued and the pressure maintained at 250 p.s.i.g. by permitting steam to escape through a condenser until the temperature of the reaction mass reaches a temperature of 240° C. The pressure is slowly reduced to atmospheric pressure over a 1.5 hour period while the temperature of the reaction mass is slowly raised to 275° C.; the polymer is held at 275° C. and at atmospheric pressure under a slow flow of nitrogen for an additional .5 hour. The copolymer thus produced contains 0.7% sulfur as an integral part of the polymer chain. The polymer is spun directly from the autoclave by increasing the nitrogen pressure. The polymer is spun in a conventional manner and drawn on conventional equipment at a draw ratio of 3.88.

Two separate repeat runs are made in the above manner so as to produce polymer containing 0.3% S and 2.0% S as an integral part of the polymer chain. As described above, the polymer batches are spun directly from the autoclave and drawn in a conventional manner.

Samples of the above yarns, along with a control sample (0% S), are exposed (dry) to the light of the Weather-Ometer for periods up to 600 hours. The resistance to property losses under these conditions, as indicated by break tenacity determinations, is shown at various intervals of exposure in Table I. The "break tenacity" ($T_B$), in grams per denier, is caluculated from the tenacity (T) and percentage break elongation (E), according to the relationship $T_B = (1+E/100)$.

TABLE I
[Break tenacity after Weather-Ometer exposure]

| Time (hours): | 0 | 100 | 200 | 300 | 400 | 500 | 600 | Yarn count, den./fils |
|---|---|---|---|---|---|---|---|---|
| Sample: | | | | | | | | |
| Modified (0.3% S) | 4.45 | 3.36 | 2.50 | 2.02 | | | | 40/13 |
| Modified (0.7% S) | 4.70 | 2.86 | 2.01 | 1.61 | | 1.20 | 0.97 | 70/34 |
| Modified (2.0% S) | 3.3 | 1.82 | 1.1 | 0.8 | 0.59 | | | 40/13 |
| Control (0% S) | 6.98 | 2.69 | 1.38 | 0.92 | | 0.69 | 0.56 | 70/34 |

The data reported in Table I shows the enhanced resistance to photodegradation inherent in the yarns of this invention, and the reduced resistance to photodegradation in the yarns having excessive amounts of modifier, i.e., modifier levels to give about 2.0% sulfur.

*Example II*

This example illustrates the improved resistance to the degradative effect of heat exhibited by the polymer of this invention.

A sample of yarn comprised of modified poly(hexamethylene adipamide) containing 0.7% sulfur prepared by the method of Example I is scoured for 30 minutes at 100° C. in a 6% aqueous detergent containing 5% sodium hydroxide based on the yarn weight. After heating for an additional 20 minutes at 180° C., the $\Delta b$ value of this modified polycarbonamide is 6.1. A similarly tested unmodified poly(hexamethylene adipamide) yarn sample has $a\Delta b$ value of 8.6.

Tenacity measurements for yarn made from modified poly(hexamethylene adipamide) containing 0.7% sulfur prepared as in Example I, and yarn of unmodified poly(hexamethylene adipamide) are givein in Table I. The samples are scoured as above, and then subjected to heating in air at 180° C. for periods of time up to 24 hours.

TABLE II
[Tenacity (grams per denier)]

| Time (hours) | 1 | 2 | 4 | 8 | 16 | 24 |
|---|---|---|---|---|---|---|
| Sample: | | | | | | |
| Modified nylon (test) | 3.36 | 2.66 | 2.19 | 1.50 | 1.58 | 1.64 |
| Unmodified nylon (control) | 3.27 | 1.86 | 1.61 | 1.46 | 1.38 | 1.22 |

*Example III*

A sample of yarn comprised of modified poly(hexamethylene adipamide) containing 0.7% sulfur prepared as in Example I, and a control sample of yarn comprised of unmodified poly(hexamethylene adipamide) are woven into test fabrics. These fabrics contain the test yarns in the filling with warps of poly(ethylene terephthalate) to provide a 90 by 150 satin fabric. Samples of these fabrics are heated in air to 180° C. for periods of time up to 4 hours. The discoloration of each sample is determined at various time intervals using the differential colorimeter. The results of this test are given in Table III.

TABLE III

| Time | 30 minutes | | 1 hour | | 2 hours | | 4 hours | |
|---|---|---|---|---|---|---|---|---|
| | $\Delta b$ | $\Delta E$ | $\Delta b$ | $\Delta E$ | $\Delta b$ | $\Delta E$ | $\Delta b$ | $\Delta E$ |
| Sample: | | | | | | | | |
| Modified nylon | 3.3 | 3.4 | 6.7 | 7.0 | 11.9 | 12.8 | 15.6 | 17.3 |
| Unmodified nylon (control) | 3.4 | 3.6 | 9.7 | 10.2 | 16.6 | 18.2 | 19.9 | 23.1 |

*Example IV*

Samples of unmodified poly(hexamethylene adipamide) yarn, similar yarn containing 0.7% by weight of sulfur prepared as in Example I, similar yarn containing 0.1% by weight of potassium iodide and 0.01% by weight of cupric acetate (as shown in U.S. Patent 2,705,227) and similar yarn containing *both* the sulfide modification and the KI/Cu(OAc)$_2$ couple, all in the same percentages, are exposed to the light of the Weather-Ometer, and the break tenacity measured after various exposures. The results are reported in Table IV.

TABLE IV
[Break tenacity after Weather-Ometer exposure]

| Time (hours) | 0 | 100 | 200 | 300 | 500 |
|---|---|---|---|---|---|
| Sample: | | | | | |
| Unmodified nylon (control) | 6.98 | 2.69 | 1.38 | 0.92 | 0.69 |
| Modified (0.7% S) (test) | 4.70 | 2.86 | 2.01 | 1.61 | 1.20 |
| Modified (KI/Cu(OAc)$_2$ (test) | 5.69 | 4.71 | 3.75 | 2.55 | 1.45 |
| Modified (*both* modifiers) (test) | 5.19 | 3.61 | 3.43 | 2.95 | 2.65 |

From the results shown in Table IV, it is seen that both additives improve the resistance of the yarn to photodegradation, as compared with the unmodified yarn, and that the effect is more than additive in the case of the combined additives.

Suitable amide-forming sulfides include bis-aminoalkyl sulfides, bis-carboxylalkyl sulfides with at least three carbon atoms separating the sulfide and carboxyl groups, amino acids or the corresponding lactams containing at least one sulfide group within the molecule, the sulfide group being separated from the carboxyl group by at least three carbon atoms, or alkylene diamines, amino acids and dicarboxylic acids containing the sulfide function disposed extralinearly to the concatenation of atoms joining the amine and/or carboxyl functions, having at least three carbon atoms between the sulfide function and the nearest carboxyl group. Bis-carboxyalkyl sulfides are preferred because of their ease of preparation. Of course, more than one sulfide compound may be employed to provide the total modification. When sulfide-containing dibasic acids, amino acids, lactams, and the like are utilized, the sulfide function should be separated from the carboxyl group by at least 3 saturated carbon atoms in order to avoid deleterious side reactions which otherwise readily occur at amidation temperatures. By adding to the copolyamide additional modifiers, such as those disclosed in U.S. Patent 2,705,227, particularly desirable properties are obtained in the filaments.

The process by which this invention is accomplished is especially useful for modifying synthetic linear polycarbonamides. By synthetic linear polycarbonamides is meant those disclosed, for example, by Carothers in U.S. Patents 2,071,250 and 2,071,253. The preparation and spinning of such polycarbonamides is disclosed in U.S. Patents 2,130,948; 2,163,636; and 2,477,156. Examples of such polycarbonamides are those prepared from suitable diamines and suitable dicarboxylic acids and their amide-forming derivatives such as hexamethylene diamine and adipic acid. Similarly, polycarbonamides from omega aminocarboxylic acids or their amide-forming derivatives, e.g., polyamide from caprolactam, are included.

The amide-forming sulfide is most readily incorporated into the polycarbonamide by condensation copolymerization therewith, usually by addition to the prepolymer salt solution. Condensation polymerization conditions are also well established in the prior art, as exemplified in U.S. Patents 2,071,250; 2,071,253; and 2,130,948 to Carothers.

The introduction of the sulfide modifier, either as the monomer, or as a related polymer, by admixture with preformed polyamides, will result in an equivalent product, provided that such addition is accomplished under conditions conducive to amide interchange, e.g., by melt blending, in order that the sulfide-containing groups actually are introduced into the main polymer chain. The copolymerization method is preferred, however, because of its simplicity and uniformity of modifier distribution throughout the base polymer.

The antioxidant protection afforded by this procedure permits preparation of shaped articles, e.g., yarns, which display appreciably lower tenacity loss and thermal discoloration after prolonged heating in air and/or exposure to light than do unmodified yarns and yarns modified in accordance with prior art procedures.

The copolycarbonamides prepared according to this invention are useful in all of the applications in which such polymers are commonly employed. They may be spun into filaments, cast into films, and extruded or molded into other useful shapes. Such articles are useful in all applications requiring resistance to light and/or heat, such as in tire cords and tarpaulins. They are prepared more readily and with less initial degradation owing to their improvement in this respect. The modification is accomplished in a straightforward manner, often without departure from the basic procedures employed in the preparation of the unmodified polymer. The enhanced stability to light and/or heat is substantially permanent, the sulfide modifier being an integral part of the main polymer structure. The modification is effective at relatively low levels and combination with some antioxidants leads to synergistic improvements in resistance to photodegradation. Other advantages inherent in the practice of this invention will occur to those undertaking its practice.

As many widely different embodiments of this invention may be made without departing from the spirit and scope thereof, it is to be understood that this invention is not limited to the specific embodiments thereof except as defined in the appended claims.

What is claimed is:

1. A synthetic linear fiber-forming aliphatic copolycarbonamide wherein recurring carbonamide groups are an integral part of the main polymer chain which is stabilized against the degradative effects of heat and light by containing about 0.3% to about 0.7% by weight sulfur based on the weight of said polycarbonamide, said sulfur being substantially exclusively in the form of divalent sulfur chemically bonded intralinearly along said main polymer chain, said sulfur and said carbonamide groups being separated by at least three carbon atoms.

2. The composition of claim 1 wherein said synthetic linear fiber-forming copolycarbonamide has incorporated therein about 0.1% by weight of potassium iodide and about 0.01% by weight of supric acetate.

3. Fiber-forming poly(hexamethylene adipamide) wherein recurring carbonamide groups are an integral part of the main polymer chain which is stabilized against the degradative effects of heat and light by containing from about 0.3% to about 0.7% by weight sulfur, said sulfur being substantially exclusively in the form of divalent sulfur chemically bonded intralinearly along the main polymer chain, said sulfur and said carbonamide groups being separated by at least three carbon atoms.

4. The composition of claim 3 wherein said fiber-forming poly(hexamethylene adipamide) has incorporated therein about 0.1% by weight of potassium iodide and about 0.01% by weight cupric acetate.

References Cited by the Examiner
UNITED STATES PATENTS

| | | | |
|---|---|---|---|
| 2,191,556 | 2/1940 | Carothers | 260—78 |
| 2,374,145 | 4/1945 | Taylor | 260—78 |
| 2,389,628 | 11/1945 | Martin | 260—78 |
| 2,705,227 | 3/1955 | Stamatoff | 260—78 |
| 3,063,966 | 11/1962 | Kwolek et al. | 260—78 |

WILLIAM H. SHORT, *Primary Examiner.*

LOUISE P. QUAST, H. D. ANDERSON,
*Assistant Examiners.*